United States Patent [19]

Fujisaki

[11] Patent Number: 5,081,660
[45] Date of Patent: Jan. 14, 1992

[54] HIGH RESOLUTION X-RAY IMAGING SYSTEM WITH ENERGY FLUCTUATION RESTRICTING FILTERS

[76] Inventor: Yokio Fujisaki, 845-2, Tashiro Daikan-cho, Tosu-shi, Saga 841, Japan

[21] Appl. No.: 533,841

[22] Filed: Jun. 6, 1990

[51] Int. Cl.⁵ .............................................. G21K 3/00
[52] U.S. Cl. ................................. 378/156; 378/157; 378/62; 378/145
[58] Field of Search .................. 378/156, 157, 54, 99, 378/62, 64, 145, 147

[56] References Cited

U.S. PATENT DOCUMENTS

| | | | |
|---|---|---|---|
| 3,860,817 | 1/1975 | Carmean | 378/156 |
| 3,976,889 | 8/1976 | Noske et al. | 378/157 |
| 4,283,625 | 8/1981 | King | 378/156 |
| 4,347,440 | 8/1982 | Haas | 378/156 |
| 4,727,561 | 2/1988 | Fujisaki | 378/54 |
| 4,727,562 | 2/1988 | Belanger | 378/99 |
| 4,744,099 | 5/1988 | Heuttenrauch et al. | 378/157 |
| 4,887,604 | 12/1989 | Shefer et al. | 378/156 |
| 4,896,037 | 1/1990 | Shimura et al. | 378/156 |
| 4,933,960 | 6/1990 | Fujisaki | 378/53 |

Primary Examiner—Janice A. Howell
Assistant Examiner—Kim-Kwok Chu
Attorney, Agent, or Firm—Leydig, Voit & Mayer

[57] ABSTRACT

An X-ray image pick-up method causes X-rays from an X-ray source to be irradiated on an object for picking up its image as passed through a filter capable of restricting any fluctuation of the effective X-ray energy within ±10%, and then the X-rays thus penetrated through the object to be picked up by an image pick-up means. Radiation dose with respect to the object and eventually to operators is thereby minimized, while the image pick-up can be realized with a high resolution.

1 Claim, 6 Drawing Sheets

HIGH RESOLUTION X-RAY IMAGING SYSTEM WITH ENERGY FLUCTUATION RESTRICTING FILTERS

BACKGROUND OF THE INVENTION

This invention relates to an X ray image pick-up method and, more particularly, to a penetration type method of picking up X-ray image with a remarkably reduced radiation dose.

The X-ray image pick-up method of the kind referred to finds itself to be useful in the medical diagnostic field with its ability of quickly diagnosing internal affected part of human body at an early stage.

DESCRIPTION OF RELATED ART

For the purpose of the medical diagnosis of the internal affected part, generally, the penetration type X-ray image pick-up method has been most frequently employed. That is, X-rays radiated from an X ray tube and penetrated through an object are directly picked up by a camera of image intensifier (which shall be hereinafter referred to simply as "I.I.") type or taken by an X-ray film.

In attaining a proper X-ray image, in general, it becomes necessary to increase X-ray radiation dose and also to obtain a number of X-ray images of the affected part from different angles, so that there arises a problem that doctors or X-ray operators working at medical facilities are forced to have a larger radiation dose. According to a presentation of the United States Academy of Science in Dec., 1989, there has been found that a proportional relationship exists between the radiation dose and radiogenic lesions, and that the rate of occurrence of cancer of the stomach is increased by three to four times with repeated irradiation, in particular, of low level radioactive rays for relatively short periods. While X-ray CT method and the like are known to be effective remarkably in real-time diagnosis of affected part, the X-ray radiation dose has to be increased in response to required time for the image pick-up.

In the X-ray image pick-up method, on the other hand, there has been a problem that a so-called beam hardening phenomenon takes place, in which, for example, the thickness of a bone is not in proportion to the degree of blackening in the bone image on the X-ray film. In other words, while X-rays show a continuous energy spectrum distribution, this distribution shows a pattern which is inclined onto one side so as to be troublesome in carrying out an accurate image pick-up. The foregoing X-ray CT method has eliminated this beam hardening through a complicated computerized correction, but this involves a problem that required facility becomes remarkably costly.

A measure for overcoming the problem of the beam hardening phenomenon have been suggested by the present inventor, as has been described in U.S. Pat. No. 4,727,561 and U.S. Pat. Application Ser. No. 299,538, in which X-rays from a single X-ray tube are made to be received by one of two sensors without penetration through the object to be measured and are also made to be received by the other sensor after being passed through a filter involving no variation in radiation absorption coefficient in response to the thickness of the object to be measured at a tube voltage of more than binary amount of the X-ray tube and through the object to be measured, and a highly precise analysis of the object can be realized with a ratio of the intensity of thus received rays at the two sensors obtained for effectively avoiding any influence of the beam hardening phenomenon.

The present invention is to create an effective X-ray image pick-up method as based on such measure for avoiding the beam hardening phenomenon as in the above.

SUMMARY OF THE INVENTION

A primary object of the present invention is, therefore, to provide an X-ray image pick-up method which has remarkably reduced the required X-ray radiation dose to decrease such dose which patients, doctors and X-ray operators have to receive and thus to restrict the radiogenic influence to be the minimum, while effectively avoiding the beam hardening phenomenon and allowing the image pick-up of high resolution to be attainable.

According to the present invention, this object can be realized by an X-ray image pick-up method in which X-rays from an X-ray source are irradiated on an object for picking up its image and are received by an image pick-up means after being penetrated through the object, characterized in that the X-rays from the X-ray source are passed through a filter before being irradiated on the object, the filter being capable of restricting any fluctuation of the effective X-ray energy to be within $\pm 10\%$.

In the present invention of the foregoing arrangement, the fluctuation of the X-rays are irradiated upon the object with the effective X-ray energy restricted to be within $\pm 10\%$, so that the beam hardening phenomenon can be effectively avoided for attaining excellent resolution, and in particular a remarkable reduction in the radiation dose can be well realized.

According to the X-ray image pick-up method of the present invention, therefore, there can be attained such effect that the X-ray image pick-up can be realized with a high resolution so as to be sufficiently contributive to the medical diagnosis and the like to render them to be accurate and reliable, and the radiation dose in particular can be remarkably reduced thus reducing the radiation dose to which the patients, doctors and X-ray operators are exposed so as to effectively prevent the radiogenic lesion occurrence.

Other objects and advantages of the present invention shall be made clear in following description of the invention detailed with reference to a preferred embodiment shown in accompanying drawings.

BRIEF DESCRIPTION OF THE DRAWINGS

FIG. 8 is an X-ray photograph taken according to the method of the present invention; and FIG. 9 is an X-ray photograph of the same part as FIG. 8 and taken according to a known method.

While the present invention shall now be described with reference to the embodiment shown in the accompanying drawings, it should be appreciated that the intention is not to limit the present invention only to the embodiment shown but rather to include all modifications, alterations and equivalent arrangements possible within the scope of appended claims.

DETAILED DESCRIPTION OF THE PREFERRED EMBODIMENT

Figure 1:
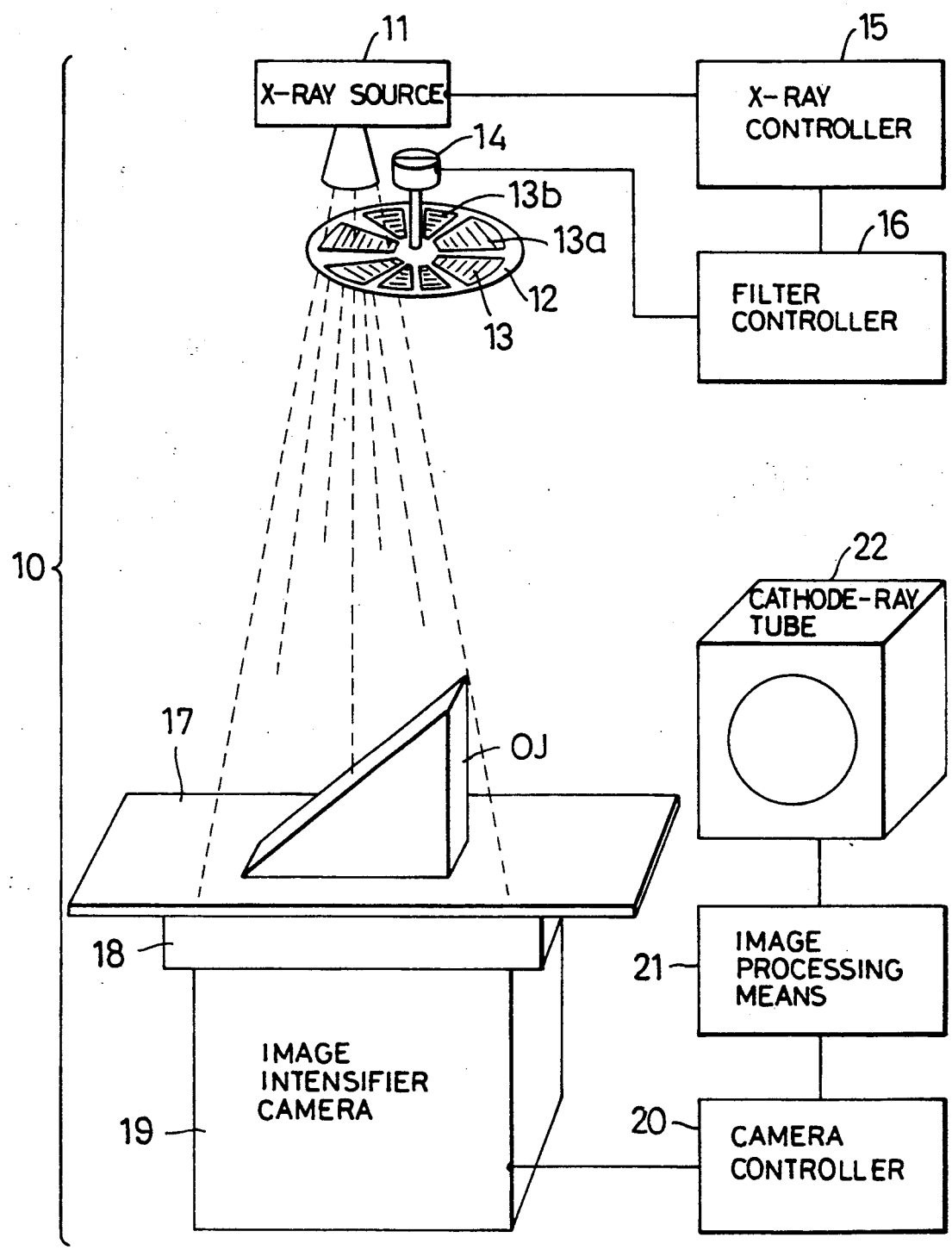
FIG. 1 is an explanatory view for an entire arrangement of elements required for carrying out the X-ray image pick-up method according to the present invention.

Referring here to FIG. 1 showing a system 10 employable for the X-ray image pick-up method according to the present invention, were system 10 include an X-ray source 11 as an X-ray tube. The source 11 is provided for radiating hard X-rays of less than 1Å, and a rotary filter disk 12 is disposed below the X-ray source 11. The rotary filter disk 12 comprises a plurality of filter members 13, 13a, 13b ... 13n respectively disposed in the disk 12 as mutually spaced in circumferential direction so that, when the disk 12 is axially rotated by means of a rotary driving means 14 for a proper rotary angle, a proper one of the filter members 13, 13a, 13b ... 13n is positioned right below the X-ray source 11. These filter members 13, 13a, 13b ... 13n are made mutually different in correspondence to various voltages applied to the X-ray source 11 and eventually to various X-ray intensities of the X-ray source 11, and are so set as to restrict any fluctuation of the effective energy of the X-rays emitted by the source to be within ±10%.

The X-ray source 11 as well as the rotary driving means 14 for the rotary filter disk 12 are provided respectively to be controllable through each of X-ray controller 15 and a filter controller 16, while the both controller 15 and 16 are mutually interlocked for indexing a corresponding one of the filter members to be effective corresponding to the energy of X-rays radiated. The X-rays passed through the rotary filter disk 12 are caused to be irradiated onto an object OJ placed on a table 17 for picking up X-ray image of the object, and the image is picked up by a film cassette 18 disposed below the table 17.

As occasion demands, it may be also possible to have the X-rays penetrating through the object picked up by an I.I. camera 19 disposed below the table 17, which camera 19 being coupled to a camera controller 20 through which the X-ray image picked up by the I.I. camera 19 is provided to an image processing means 21, and a see-through image is provided as an output of a cathode-ray tube (CRT) 22 interlocked to the image processing means 21.

In the foregoing system 10, the X-rays are radiated by the X-ray source 11 while radiated energy of the X-rays is adjusted by the X-ray controller 15. The thus radiated X-rays are passed through one of the filter members 13, 13a, 13b ... 13n which is indexed by rotating the rotary filter disk 12 so as to have the fluctuation of the effective energy of the X-rays lowered to be within ±10%. The rotation in this instance of the rotary filter disk 12 is carried out through the rotary driving means 14 with the filter controller 16 in accordance with an output from the X-ray controller 15 to the X-ray source 11. The X-rays passed through the indexed filter member are caused to be irradiated onto the object for picking up its image so that the see-through image of the object OJ will be picked up by the film cassette 18 in a so-called direct image pick-up process or by the I.I. camera 19 to be visualized through the camera controller 20, image processing means 21 and cathode-ray tube 22.

EXAMPLE 1

Figure 2:
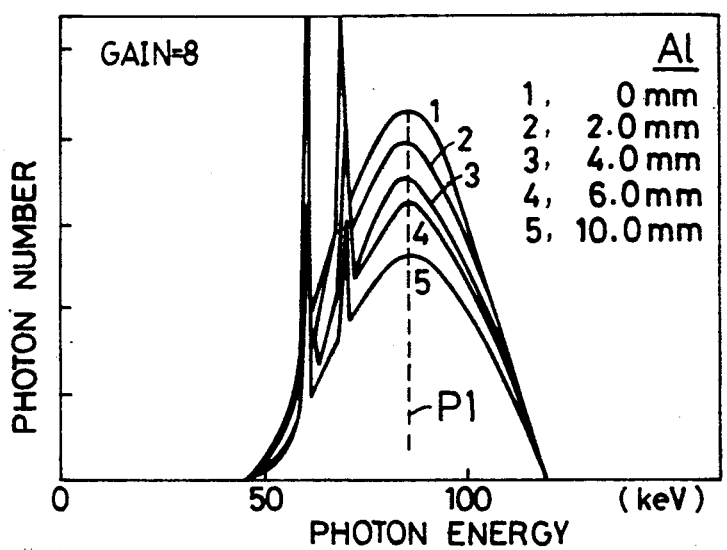
FIG. 2 is a spectrum distribution diagram according to the method of the present invention as represented in FIG. 1.

The X-ray image pick-up method according to the present invention was used, Al plates stacked so as to vary stacked thickness gradually in five steps were employed as the object for the image pick-up by the method, and the X-ray spectrum distribution was measured by means of a pure Ge semiconductor detector, results of which have shown that, as seen in FIG. 2, no inclination was caused to occur in the effective energy distribution, with central values of the respective energy distributions for the varying stacked thickness of the object as represented by a broken line Pl connecting these central values substantially aligned to be vertical. It has been found therefore that, according to the X-ray image pick-up method of the present invention, the influence of the beam hardening phenomenon could be avoided substantially and the resolution could be improved. In the present Example, the method was carried out with the tube voltage of 120kV and the tube current of 50μA for the X-ray source 11.

COMPARATIVE EXAMPLE 1

Figure 3A:
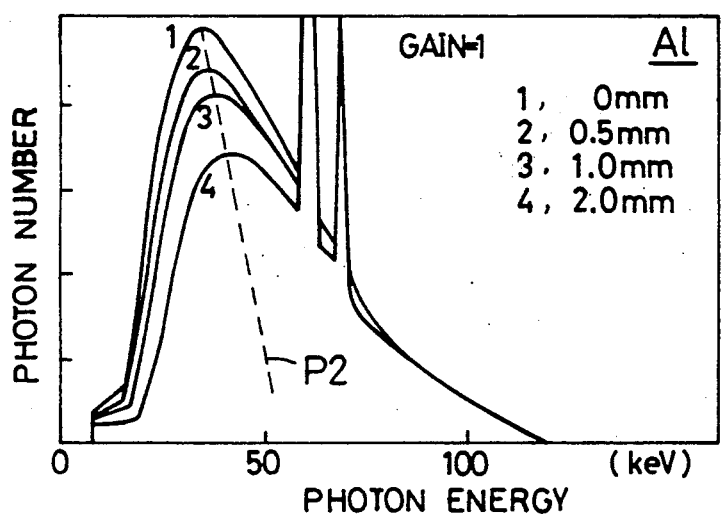
FIGS. 3a and 3b are spectrum distribution diagrams according to different image pick-up methods from the method of the present invention and shown in contrast to FIG. 2.

Except for an omission of the rotary filter disk, a substantially identical X-ray image pick-up method to that of Example 1 was employed, and the X-ray spectrum distribution was measured by means of the pure Ge semiconductor detector with respect to the similarly stacked Al plates with the stacked thickness varied in four steps, results of which were as in FIG. 3a. As seen therein, the effective energy distributions for the respective varying thickness have involved an inclination. That is, a broken line P2 connecting the center values of the respective energy distrubutions was inclined as influenced by the beam hardening phenomenon and the resolution was thereby deteriorated.

COMPARATIVE EXAMPLE 2

Figure 3B:
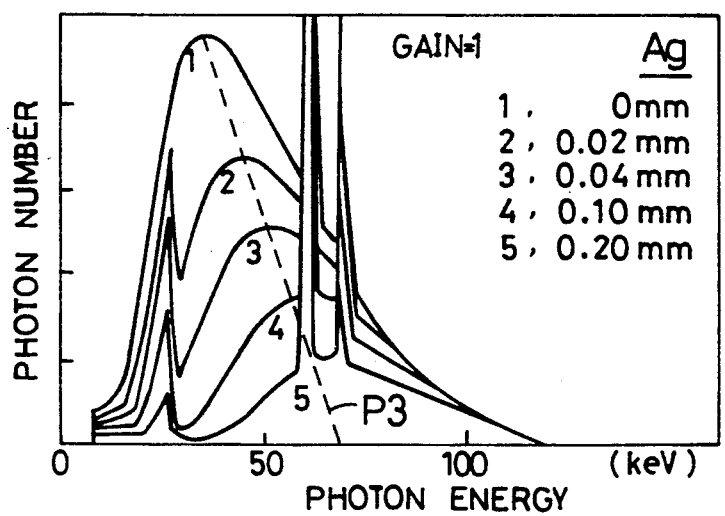

Except for the omission of the rotary filter disk, a substantially identical X-ray image pick-up method to that of Example 1 was employed, the X-ray spectrum distribution was measured by means of the pure Ge semiconductor detector with respect to a stack of Ag plates employed as the object with the stacked thickness varied in five steps, and results of such measurements have shown that, as shown by a center value line P3 in FIG. 3b, the effective energy distributions involved a larger inclination than in the case of FIG. 3a as strongly influenced by the beam hardening phenomenon, and the resolution was thereby further deteriorated.

Figure 6:
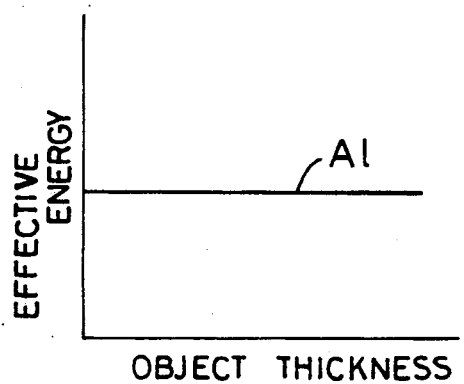
FIG. 6 is a diagram showing the relationship between the thickness of the object and the effective energy of X-rays in the method according to the present invention.
Figure 7:
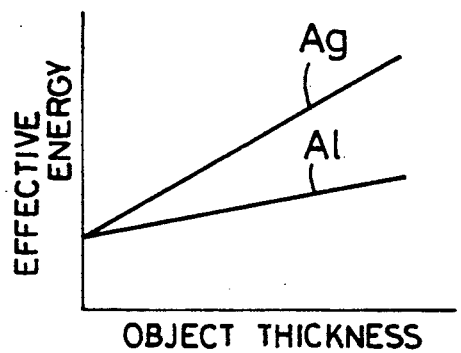
FIG. 7 is a similar diagram showing the relationship between the thickness of the object and the effective energy of X-rays in a method not according to the present invention.

As will be clear from the foregoing Comparative Examples 1 and 2, it is considered that the object of a larger atomic number sustains a larger influence of the beam hardening phenomenon. Provided that, therefore, the atomic number of the object for the image pick-up is also taken into account as one of parameters and the indexed one of the filter members on the rotary filter disk is so selected as to be suitable for avoiding the beam hardening phenomenon, i.e., for causing no inclination in the line connecting the center values of the effective X-ray energy distributions for the varying object thicknesses, it will be possible to obtain excellent image irrespective of the type or sort of the object. In this connection, the effective energy has been caused to vary depending on the type and the atomic number of the object in the case of Comparative Examples 1 and 2, whereas in the case of Example 1 according to the present invention the effective energy has involved no substantial variation as shown in FIG. 6 irrespective of the type or atomic number of the object and it has been made possible to carry out the qualitative and quantitative determination of the object.

In the image pick-up method according to the present invention, too, on the other hand, the effective energy is caused to vary due to variation in such conditions as source voltage, source current, room temperature, humidity and so on, but it is possible to render the effective energy to be stationary by restricting the fluctuation of the effective energy to be within ±10keV when the effective energy is 100keV and within ±10% when the effective energy exceeds 100keV.

EXAMPLE 2

The X-ray image pick-up method according to the present invention was used to pick up the image of an object of Al plates sequentially stacked, and the blackening was monitored by the cathode-ray tube through the I.I. camera until the image in the central part of the stacked plates becomes invisible due to the blackening increased while peripheral outline of the topmost stacked Al plate still remains, so that the minimum thickness of the Al plates in which they are visible and recognizable as the object was measured. Further, a ring-shaped copper wire of a thickness of 0.6 mm was placed on a stack of Al plates as the object for the image pick-up, and the blackening of the X-ray image of the object was monitored through the I.I. camera and by the cathode-ray tube while sequentially adding the number of the Al plates so as to build up the stack, until the copper wire ring became invisible on the monitored image due to the blackening increased by the addition of the Al plates, whereby the maximum thickness of the stack of the Al plates in which they are visible and recognizable as the object was measured. In the present Example, the image pick-up method was carried out with the tube voltage of 80kV and the tube current of 1mA for the X-ray course.

COMPARATIVE EXAMPLE 3

Except for the omission of the rotary filter disk, the same image pick-up method as in Example 2 was employed, and the minimum thickness of the stack of the Al plates as well as its maximum thickness were measured in the same manner as in Example 2.

Figure 5:
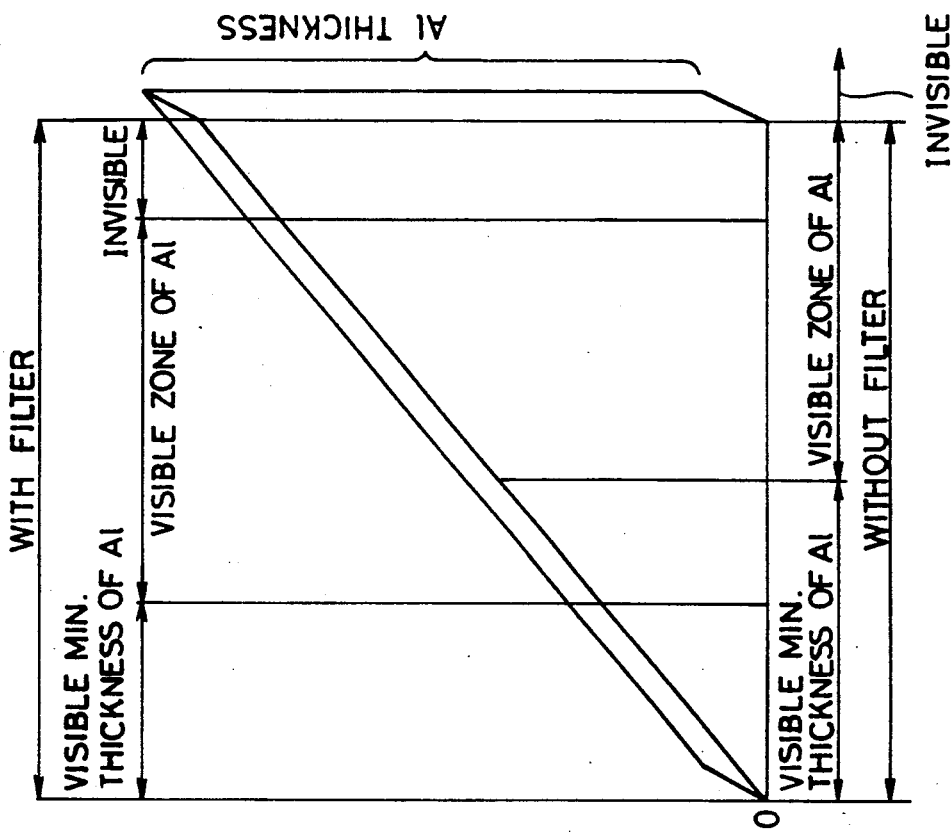
FIG. 5 is a typical diagram showing the relationship between the depth of focus of X-rays and a gradient of the object the image of which is picked up according to the present invention as shown in contrast to that not according to the present invention.
Figure 4:
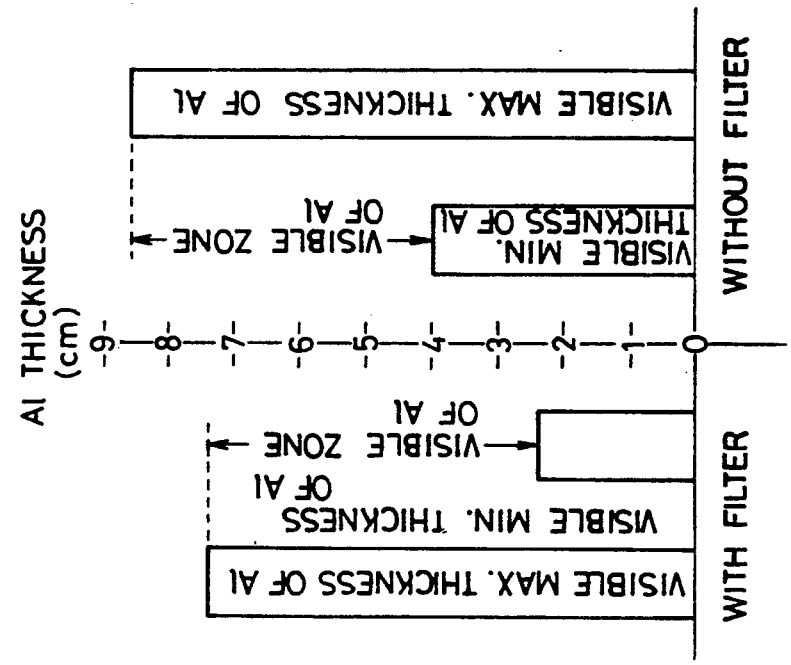
FIG. 4 is a typical diagram showing the relationship between the depth of focus of X-rays and the thickness of the object the image of which is to be picked up according to the present invention as shown in contrast to the relationship not according to the present invention.

The relationship between the stacked thickness of the Al plates and the image blackening in Example 2 and Comparative Example 3 is as shown in FIG. 4, while the extent to which the Al plates are visible (depth of focus) and the gradient in the thickness of the stacked Al plates are shown in FIG. 5 on the basis of FIG. 4. As a result, the radiation dose R1 required in Example 2 according to the present invention has been determined to be 54mR/min., which showing a rational decrease to be 2.7%{(R1/R2)×100} in contrast to the radiation dose R2 of 2,020mR/min. required in Comparative Example 3. Further, the minimum thickness T1 of the stacked Al plates with which the central part of the topmost Al plate becomes invisible due to the blackening has been 2.4 cm, while the same minimum thickness T2 of the stacked Al plates with which the central part of the topmost Al plate has become invisible in Comparative Example 3 has been 4.0 cm, so that the decrease in the minimum thickness could be limited to be about 60%{(T/T2)×100} notwithstanding the rational decrease to be 1/37 in the radiation dose. Further, in Example 2, the maximum thickness T3 of the stacked Al plates with which the image of the copper wire ring placed on the top of the stacked Al plates has been 7.4 cm, whereas the same maximum thickness T4 in Comparative Example 3 has been 8.6 cm so that the increase in the maximum thickness could be limited to be about 86% {(T3/T4)×100}. It has been found, accordingly, that the zone Z1 in which the Al plates are visible in the X-ray image is 5.0 cm(T3-T1) in Example 2 whereas the visible Zone Z2 in Comparative Example 3 is 4.6 cm(T4-T2), so that the visible zone could be expanded according to Example 2 to be 109%{(Z/Z2)×100} in comparison with Comparative Example 3.

EXAMPLES 3-7

The radiation dose and the visible zone of the object in the X-ray image of the object were measured in the same manner as in Example 2 but with the object for the image pick-up and the tube voltage varied as listed in a following Table, in which the filter members were also varied suitably as shown in the following Table.

COMPARATIVE EXAMPLES 4-8

With the object for the image pick-up and the tube voltage varied as also listed in the following Table, the radiation dose and the visible zone of the object were measured in the same manner as in Comparative Example 3.

As the results of these Examples 3-7 and Comparative Examples 4-8, it has been found that, in the case when the measurement has been obtained through the X-ray image pick-up method according to the present invention, the radiation dose required for the image pick-up can be drastically reduced and eventually the radiation dose to which the operators must be exposed can be minimized, so that the method will be extremely useful when applied to the medical diagnoses, the resolution with respect to the object can be remarkably improved, and the depth of focus made larger allows a high quality X-ray image to be reliably provided. As will be clear when the X-ray photograph as in FIG. 8 for a knee picked up by the X-ray image pick-up method according to the present invention is compared with the other X-ray photograph as in FIG. 9 of the same knee taken by a known method, it is possible to obtain the X-ray photograph in higher quality than in the case of the known method.

TABLE

| | EXAMPLES: | | | | | COMPARATIVE EXAMPLES: | | | | |
|---|---|---|---|---|---|---|---|---|---|---|
| | 3 | 4 | 5 | 6 | 7 | 4 | 5 | 6 | 7 | 8 |
| Object for Image Pick-Up: | Acrylic | Acrylic | Al | Al | Al | Acrylic | Acrylic | Al | Al | Al |
| Filter Member (for use with): | 60 kV | 80 kV | 60 kV | 100 kV | 120 kV | — | — | — | — | — |
| Tube Voltage: (kV) | 60 | 80 | 60 | 100 | 120 | 60 | 80 | 60 | 100 | 120 |
| Tube Current: (mA) | 1 | 1 | 1 | 1 | 1 | 1 | 1 | 1 | 1 | 1 |
| Radiation Dose: | | | | | | | | | | |
| (mR/min.) | 56.4 | 54.0 | 56.4 | 30.4 | 71.7 | 1600 | 2020 | 1600 | 2120 | 2370 |
| Ratio (%) | 3.5 | 2.7 | 3.5 | 1.4 | 3.0 | — | — | — | — | — |
| X-Ray Penetration: | | | | | | | | | | |
| Max. Thick. (cm) | 21 | 26 | 4.4 | 7.8 | 9.4 | 25 | 31 | 5.2 | 10.2 | 11.2 |
| Min. Thick. (cm) | 6 | 10 | 1.2 | 2.4 | 5.0 | 11 | 17 | 2.2 | 5.8 | 7.4 |
| Visible Zone (cm) | 15 | 16 | 3.2 | 5.4 | 4.4 | 14 | 14 | 3.0 | 4.4 | 3.8 |

What is claimed is:

1. An X-ray image pick-up method employed in medical systems, comprising steps of:

radiating X-rays from an X-ray source;

passing the X-rays through a filter which restricts any fluctuation of the effective energy of the X-rays to within ±10% of the effective energy irradiated from the source;

irradiating an object with the X-rays passed through the filter, thereby producing a clear, high resolution image of the object.

* * * * *